Jan. 2, 1951   J. GAZALSKI   2,536,736
DECOY
Filed Sept. 30, 1948
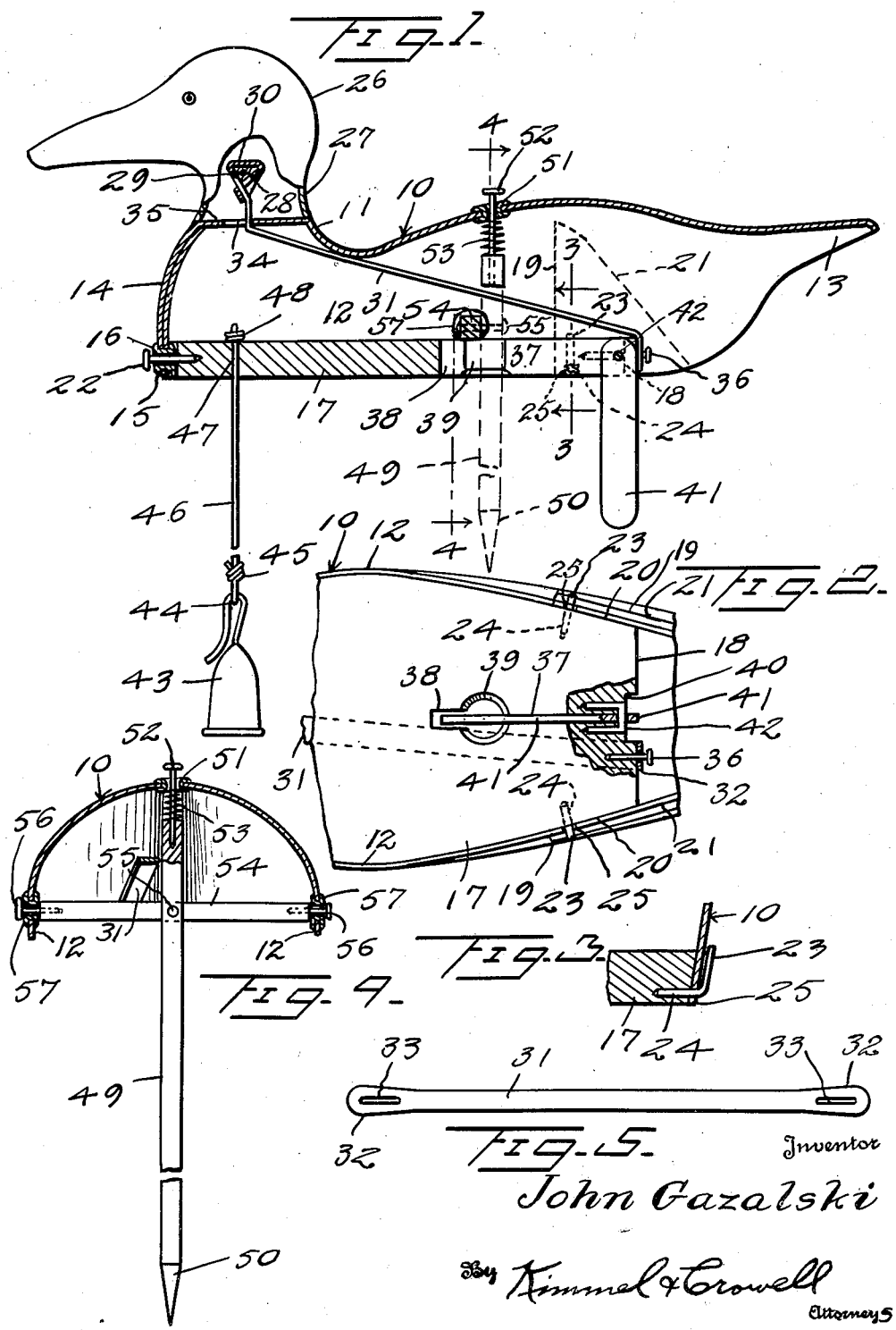
Inventor
John Gazalski
By Kimmel & Crowell
Attorneys Patented Jan. 2, 1951

2,536,736

UNITED STATES PATENT OFFICE 2,536,736

DECOY

John Gazalski, Henryetta, Okla.

Application September 30, 1948, Serial No. 51,961

5 Claims. (Cl. 43—3)

My invention relates to decoys used by hunters to entice or lure ducks or geese within gunshot, and an object thereof is to provide a combination land and water or marsh duck or goose decoy of a knock-down type or character.

The invention comprehends a decoy which can be anchored on land or anchored and floated in a marsh or on water, and also a knock-down duck or goose decoy of the above interchangeable or combined anchoring characteristics whereby either or both of said anchoring means may be employed independently or simultaneously, respectively, when in use, or the entire structure knocked down and all parts conveniently housed within the hollow body of the decoy for stacking or telescoping for easy carrying and to render the same more compact and to occupy less space for transportation, shipment or storage.

The decoy embodies a hollow body part simulating a duck or goose and a separate head part having a neck detachably or removably mounted on the body at the base of the neck conforming thereto, said parts being preferably formed of molded sections or sheets, there being a flat bottom float closing the major portion of the open bottom of the body with resilient means connecting the head within the neck thereof to the bottom float to removably secure the head turnably in an upstanding position, together with a depending knock-down or foldable keel to hold the decoy upright pivotally secured to or engaged with the body at the bottom float to give or compensate for slight relative movements up and down between the anchoring means and body, and the latter being reinforced at points of connection of the bottom float therewith.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings,

Figure 1 is a longitudinal elevation view, partly in section of a decoy embodying my invention, Figure 2 is a fragmentary bottom view, partly in section, Figure 3 is a fragmentary vertical section taken on the line 3—3 of Figure 1, Figure 4 is a transverse vertical sectional view taken on the line 4—4 of Figure 1, Figure 5 is a plan view of a resilient element for connecting the body to the bottom float and holding the head in position.

Referring to the drawing in detail, the decoy includes a hollow body part 10 which is of a contour to simulate the appearance of the body of a duck or goose, with a straight horizontal bottom edge and flat bottom and an upstanding substantially frusto-conical neck forming portion or boss 11 at the front of the closed top and freely open at the bottom between the sides 12 and tapered rearwardly extending tail 13. The body may be pressed or molded from a sheet of papier-mâché, fiber or other suitable material, overlapped and connected as indicated to reinforce the same and produce the convexly rounded shape at the front or breast portion as shown in Figure 1. These overlapping portions are provided with registering holes 15 to receive an eyelet 16 for connecting the same centrally of the width of the body and near the horizontal bottom edge thereof. A buoyant flat bottom float member 17 is detachably and somewhat pivotally mounted in the open bottom portion of the body and conforms in outline to the contour of the latter to a point spaced from the rear or tail portion where it is provided with a straight transverse end 18.

The sides of the body are also provided with rearwardly extending members 19 which overlie the body as at 20 and have rearwardly inclined edges 21 which, when the body is ornamented to simulate a particular species of duck or goose, will represent the wings in addition to forming a double wall at this point the same as at the front or breast.

A headed pin 22 is disposed through the front hole or eyelet 16 and anchored in the front end of the bottom float 17, which may be of wood, cork or other light buoyant material to float in water or set flat in marsh or upon the ground or be removed in the latter instance to set flat upon the horizontal straight flat bottom edge. At the side edges of the float 17 angular fasteners 23 are provided, the same being anchored in the float at their horizontal lower portions 24 and extended through notches 25 in said bottom edges tending to prevent displacement, the edges of the body being positioned between the opposite inwardly sloping edges of the float 17 and the upwardly extending sloping portions of the fasteners or body retaining means 23.

The head 26 simulating that of a duck or goose may also be pressed, molded or otherwise formed of the same or different material with respect to that forming the body 10. The neck portion 27 of the head flares outwardly and is open at the bottom to fit over and conform to the neck forming portion or boss 11 so as to be capable of turning thereon. In order to hold the head which includes the neck and beak in position on the part 11 resiliently, a transverse bar 28 is arranged horizontally between the sides of the neck 27 and anchored by pins or brads 29 at its ends through the wall of the neck to take the upper looped end 30 of a resilient member or strip 31 of suitable material such as rubber having enlarged ends 32 with slots 33 and anchored around the bar 28 by passing the same over the bar and one end through a slot 33 to extend downwardly through an opening 34 in the top wall 35 of the part 11 of the body. This resilient member then extends downwardly and rearwardly under the depressed portion of the body 10 adjacent the neck forming portion or boss 11 and make contact therewith as shown. Its opposite end is extended over the rear end or edge 18 of the float 17 as seen in Figures 1 and 2, and engaged over a headed pin or anchoring member 36 whereby the body is resiliently associated or engaged with the float in the back thereof to retain the float upwardly so that the fasteners 23 engage the bottom edges of the sides of the body 10 or the notches 25 and permit slight relative pivoting movements up and down between the float and body and anchoring means which are provided for the float which forms the bottom or base of the decoy and body thereof. Primarily, the resilient or elastic member or connection 31 retains the head 26 in position on the body and permits the same to be manually turned to either side, or turned due to agitation in bobbing up and down in the water or from the wind.

In order to anchor the decoy in a marsh or provide a keel therefor in the water to resist floating sideways and tending to hold the same in the wind, the bottom or float 17 is provided with a longitudinal slot 37 communicating with its rear end 18 and extending a substantial distance into the bottom centrally and longitudinally and provided at its inner end with an enlargement or widened portion 38 and an adjacent communicating circular enlargement 39 all of which extend through the base or float 17. End 18 is provided with a recess 40 extending on each side of the slot 37 and a flat rigid bar or strip 41 is pivoted at 42 on a horizontal axis to swing vertically at its upper end so that the bar or strip may be extended downwardly as shown in Figure 1 to form an anchoring post or keel, to assist in anchoring the device in the ground or in a marsh, or to resist side sway, tipping over or movement of the decoy from the wind and to keep the head in the wind, especially when floating in water.

Pivot 42 may be in the form of a staple anchored in the rear end of the bottom float member 17 at the recess 40 with its bight portion forming the pivot axis of the strip 41 by providing a hole through the latter near its upper end by which the same is pivoted on the member 42 within the slot 37 so as to permit it to be folded forwardly and upwardly into the slot or extended downwardly in operative position. The enlargements 38 and 39 facilitate gripping of the bar or strip 41 in order to displace it downwardly and the strip is substantially the same width as the thickness of the bottom float 17 so as to be accommodated in the slot 37 when the device is compactly folded for transportation, shipment or storage.

When the device is used in marsh or in water it may be anchored by a weight 43 having a hook 44 secured by a loop or otherwise as indicated at 45 to the lower end of an anchoring cord 46 having its opposite upper end extended through a hole 47 through the bottom float 17 and knotted as indicated at 48 to anchor the same from displacement, it being understood that the weight of an the anchor is adapted to be rested upon the bed of a body of water.

As further means for anchoring the decoy in shallow water upon the bed thereof, in a marsh or upon the ground, a vertical anchoring post or bar 49 is provided with a pointed lower end 50 to pierce the bottom or bed of the marsh or shallow water, or anchor in the ground on land and is adapted to extend up through the opening 39 with its upper end extending in close proximity to the top or back of the body 10 where the latter is provided with an opening in the form of an eyelet 51. A headed pin 52 is anchored in the upper end of the post or bar 49 to extend through the opening or eyelet 51 and a resilient member or coil spring 53 is arranged upon the pin and interposed between the upper end of the bar or post 49 and the top or back of the body at the eyelet 51 to resiliently associate the body with the anchoring post and the base member or bottom float 17 as will be now explained. For this purpose, a crossbar 54 is pivotally attached to the bar 49 and in front thereof as indicated at 55 as by a pin extending through said bars so that the crossbar 54 will rest upon the top surface of the base member or bottom float 17 across the openings 38 and 39 of the slot 37. The ends of the crossbar 54 are provided with headed pins or the like 56 to engage through holes or eyelets 57 at the sides of the body 10 adjacent the bottom edges thereof, thus permitting slight relative movement up and down between the base or float 17 and the body, limited in the upward movement by the crossbar 54, except for the give or compensation permitted by the resilient member or spring 53 and the resilient connecting member or strip 31. The body and float may have relative movements in which the body or the float, that is, one relative to the other, may move up and down, the fasteners 23 permitting such slight relative movements on the headed pin or fastener 22 as a pivot at the opening or eyelet 16 during which the members 31 and 53 or either may expand and contract.

The knock-down character of the device is enhanced by the keel strip or anchoring bar 41 being folded into the slot 37 and enlargements 38 and 39 thereof from the depending vertical position shown in Figure 1 when in use, to an inoperative compactly folded position where it is precluded from view and maintained within the area or thickness of the bottom float or base 17. The parts 31 and 49 may also be detached and removed by disconnecting the strip 31 at one end from the headed pin 36 and displacing the head 26 which may be arranged in the body 10 together with the weight 43. In disconnecting the part 49, the bottom 17 is removed to separate the parts 17 and 49 or permit the crossbar 54 to be swung into alignment with the bar 49 to extend downwardly through the opening 39 together with the spring 53 and headed pin 52 when the bottom is replaced so that these parts may also be accommodated within the body lengthwise to provide a compact arrangement to occupy a minimum of space for transportation, shipment or storage.

The float 17 is used in the water but it or the straight flat bottom edge of the body 10 may be used as a base on land or in marsh or shallow water when bar or post 49 with pointed end 50 is used as a pin to anchor the decoy. The float and pin or post are both removable so that decoys or bodies thereof can be knocked down and telescoped or nested within one another and compactly stacked for easy carrying.

I claim:

1. A decoy comprising a rigid hollow body terminating in lower edges and open at the bottom thereof, a head detachably mounted on the top of the body at the forward end thereof, a base loosely engaging the lower edges of said body in the open bottom of said body and loosely connected to the latter at the front end thereof, means on the side edges of said base slidably engaging the lower edge of said body for limiting the movement of said base into said body, and a resilient tension connection between said head and the rear end of said base.

2. A decoy comprising a rigid hollow body terminating in lower edges and open at the bottom, a bottom float loosely engaging said lower edges within the open lower part of the body, said body having double wall portions with reinforced openings at the front and sides, an anchoring post extending up through the float and depending therefrom, a crossbar pivotally mounted on the post and detachably connnected through the side openings and resiliently connected to the top of the body, said float being loosely and detachably connected to the body at the front opening with the crossbar resting upon the float and having upwardly bent pins extending from the sides thereof for engagement with the bottom edge of said body, and a tension member connected to the rear of said float and to said body for constantly urging said pins against said bottom edge.

3. A decoy comprising a rigid hollow body terminating in lower edges open at the bottom, a bottom float loosely engaging said lower edges within the hollow lower part of the body, said body having double wall portions with reinforced openings at the front and sides, an anchoring post extending up through the float and depend-therefrom, a crossbar on the post detachably connected through the side openings and resiliently connected to the top of the body, said float being loosely and detachably connected to the body at the front opening with the crossbar resting upon the float, angled fastening means extending from the sides of said float for engagement with the lower edge of said body, and a tensioning member connected to said float and said body for constantly urging said fastening means against said lower edge, the top of the body having a reinforced opening through which the upper end of the post is engaged and the resilient means being interposed between the latter reinforcement and upper end of the post.

4. In a decoy, a rigid hollow body terminating in lower edges, a flat bottom member engaging loosely said lower edges within the lower open part of the body, said body having a reinforced front opening, a pin engaged loosely through the opening and with said member, fasteners extending from the sides of the bottom member and upwardly adjacent said sides to slidably receive the lower edge of the sides of the body therebetween, and resilient means connected to said bottom member and said body for constantly urging said fasteners against said lower edge.

5. In a decoy, a rigid hollow body terminating in lower edges and open at the bottom thereof, a flat bottom float member loosely engaging said lower edges within the lower open part of the body, said body having a reinforced front opening, a pin loosely engaged through the opening and with said member, fasteners extending from the sides of the member and upwardly adjacent said sides to slidably receive the lower edge of the sides of the body therebetween, a head removably mounted on the forward upper portion of the body, tensioning means connected to said float member at the back thereof and extending through said body and anchored to said head, and additional anchoring means connected to and depending from the member, said anchoring means including an upright post extending upwardly through said float member with a crossbar resting on the top thereof and detachably engaged with the sides of the body, and the upper end of the post being detachably and resiliently connected to the top of the body.

JOHN GAZALSKI.

REFERENCES CITED

The following references are of record in the file of this patent:

UNITED STATES PATENTS

| Number | Name | Date |
| --- | --- | --- |
| 955,203 | Reynolds | Apr. 19, 1910 |
| 1,473,612 | Dewey | Nov. 13, 1923 |
| 1,527,711 | Stallman | Feb. 24, 1925 |
| 1,571,711 | Dewey | Feb. 2, 1926 |
| 1,598,619 | Reynolds | Sept. 7, 1926 |
| 1,604,614 | Stoner | Oct. 26, 1926 |
| 2,011,480 | Gazalski | Aug. 13, 1935 |